United States Patent
Hutchinson et al.

(10) Patent No.: US 10,609,033 B2
(45) Date of Patent: *Mar. 31, 2020

(54) PRINCIPAL ACCESS DETERMINATION IN AN ENVIRONMENT

(71) Applicant: Microsoft Technology Licensing, LLC, Redmond, WA (US)

(72) Inventors: Blake R. Hutchinson, Seattle, WA (US); Jesse Shi-Yuan Ou, Seattle, WA (US); Ambrose Y.W. Leung, Issaquah, WA (US); Brandon A. Chalk, Bothell, WA (US); Robert J. Mooney, III, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/225,321

(22) Filed: Dec. 19, 2018

(65) Prior Publication Data

US 2019/0124085 A1    Apr. 25, 2019

Related U.S. Application Data

(63) Continuation of application No. 15/171,869, filed on Jun. 2, 2016, now Pat. No. 10,200,372.

(51) Int. Cl.
    *H04L 29/06* (2006.01)
(52) U.S. Cl.
    CPC .............. *H04L 63/10* (2013.01); *H04L 63/20* (2013.01)

(58) Field of Classification Search
    CPC .............................. H04L 63/10; H04L 63/20
    See application file for complete search history.

(56) References Cited

U.S. PATENT DOCUMENTS

| | | | |
|---|---|---|---|
| 6,044,466 A * | 3/2000 | Anand | G06F 9/468 726/1 |
| 7,028,057 B1 * | 4/2006 | Vasudevan | G06F 16/2474 707/695 |
| 8,000,680 B2 * | 8/2011 | Song | H04L 63/205 455/410 |
| 8,793,768 B2 * | 7/2014 | Beck | G06F 21/33 726/4 |
| 9,065,743 B2 * | 6/2015 | Bakshi | H04L 41/12 |

(Continued)

*Primary Examiner* — Sarah Su
(74) *Attorney, Agent, or Firm* — Buckley, Maschoff & Talwalkar LLC (57) ABSTRACT

An access determination management system obtains information regarding various different entities in a system (e.g., a networked environment) and what rights or privileges those entities have. An entity, also referred to herein as a principal, can be a user, a computing device, a group of users, a group of computing devices, or a service. The rights or privileges that an entity has includes, for example, whether administrative privileges are available to the entity, whether a particular program can be executed, whether an entity is a member of another entity, and so forth. The access determination management system uses the obtained information to generate and display a graph of the environment. The graph of the environment includes the different objects as well as links between the objects that indicate rights or privileges one object has with respect to another.

20 Claims, 6 Drawing Sheets

(56) References Cited

U.S. PATENT DOCUMENTS

| | | | | |
|---|---|---|---|---|
| 9,075,506 | B1* | 7/2015 | Uchida | G06F 11/34 |
| 9,100,430 | B1* | 8/2015 | Seiver | H04L 63/1433 |
| 9,514,331 | B2* | 12/2016 | Kanter | G06F 21/6245 |
| 10,200,372 | B2* | 2/2019 | Hutchinson | H04L 63/20 |
| 2006/0294197 | A1* | 12/2006 | Mital | G06Q 10/06 709/217 |
| 2007/0143219 | A1* | 6/2007 | Shen | G06F 21/10 705/52 |
| 2010/0179874 | A1* | 7/2010 | Higgins | G06K 9/00664 705/14.53 |
| 2010/0192195 | A1* | 7/2010 | Dunagan | G06F 21/577 726/1 |
| 2013/0282812 | A1* | 10/2013 | Lessin | G06Q 50/01 709/204 |
| 2014/0040182 | A1* | 2/2014 | Gilder | G06F 17/2264 707/602 |
| 2014/0280936 | A1* | 9/2014 | Nandagopal | H04L 67/22 709/225 |
| 2015/0033106 | A1* | 1/2015 | Stetson | G06F 16/24566 715/215 |
| 2015/0370824 | A1* | 12/2015 | Chui | G06F 16/21 707/786 |
| 2017/0353480 | A1* | 12/2017 | Gao | G06F 21/577 |
| 2019/0155524 | A1* | 5/2019 | Frank | G06F 11/3034 |

\* cited by examiner

PRINCIPAL ACCESS DETERMINATION IN AN ENVIRONMENT

CROSS-REFERENCE TO RELATED APPLICATIONS

The present application is a continuation of U.S. patent application Ser. No. 15/171,869, filed Jun. 2, 2016, the contents of which are incorporated by reference herein for all purposes.

BACKGROUND

As computing technology has expanded, computing devices have become increasingly interconnected. However, given the confidential or private information that people oftentimes store on their computing devices, this increased interconnectivity has also resulted in increased exposure of information to others that users desire to keep confidential or private. Keeping information confidential or private in the presence of this interconnectivity of computing devices remains difficult.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, one or more principals in a system are communicated with to collect data regarding the principals as well as rights or privileges the principals have in the system. The communicating includes receiving data regarding the principals from one or more data collection tools running on one or more of the principals. A graph including multiple objects is generated, each object representing one of the principals. Links between objects in the graph are established based on the rights or privileges. Using the graph, a path is determined between a source principal in the system and a target principal in the system, the path transiting zero or more additional principals between the source principal and the target principal.

In accordance with one or more aspects, a system includes one or more processors, and one or more computer-readable storage medium having stored thereon multiple instructions that, responsive to execution by the one or more processors, cause the one or more processors to perform acts. These acts include communicating with one or more of principals in an environment to collect data regarding the principals as well as rights or privileges the principals have in the environment, the communicating including receiving data regarding the principals from one or more data collection tools running on one or more of the principals. These acts also include generating a graph including multiple objects, each object representing one of the principals, and including, in the graph, links between objects in the graph based on the rights or privileges. These acts further include generating at least one set of instructions to automate access to a target principal in the environment from a source principal in the environment, and using the at least one set of instructions to verify access to the target principal from the source principal.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Principal access determination in an environment is discussed herein. An access determination management system obtains information regarding various different entities in a system (e.g., a networked environment) and what rights or privileges those entities have. An entity, also referred to herein as a principal, can be, for example, a user (or user identity), a computing device, a group of users, a group of computing devices, or a service. The rights or privileges that a principal has includes, for example, whether administrative privileges are available to the principal, whether a particular program can be executed, and so forth.

The access determination management system uses the obtained information to generate and display a graph of the environment. The graph of the environment includes multiple objects each representing a principal, and links between the objects that indicate rights or privileges a principal represented by one object has with respect to another principal represented by another object. These links allow a user of the access determination management system to readily identify which principals have access to which other principals, and a path that may be used to get to one principal from another.

In the context of a security breach, direct access to a target principal by an attacker is not always feasible due to the security controls placed on the environment. An attacker will often "pivot" access to the target principal in these scenarios by compromising a series of intermediate target principals, each providing a level of access that enables deeper penetration into the environment, until the target principal is reached. By displaying the graph with the various different objects, and links between objects, a user of the access determination management system can readily identify paths through one or more principals in the environment that an attacker may attempt to access to reach the target principal.

Additionally, over time access control in an environment tends to atrophy, leaving principals with access to assets that may no longer be needed. This exposes the environment to unnecessary risk. The techniques discussed herein provide a holistic view of system permissions (e.g., rights and privileges of principals) across an environment, as well as insight into opportunities to perform permission transitions which enable a source principal to access a target principal. This allows such exposure to be identified, and a user to take the appropriate actions to reduce or eliminate the exposure.

Figure 1:
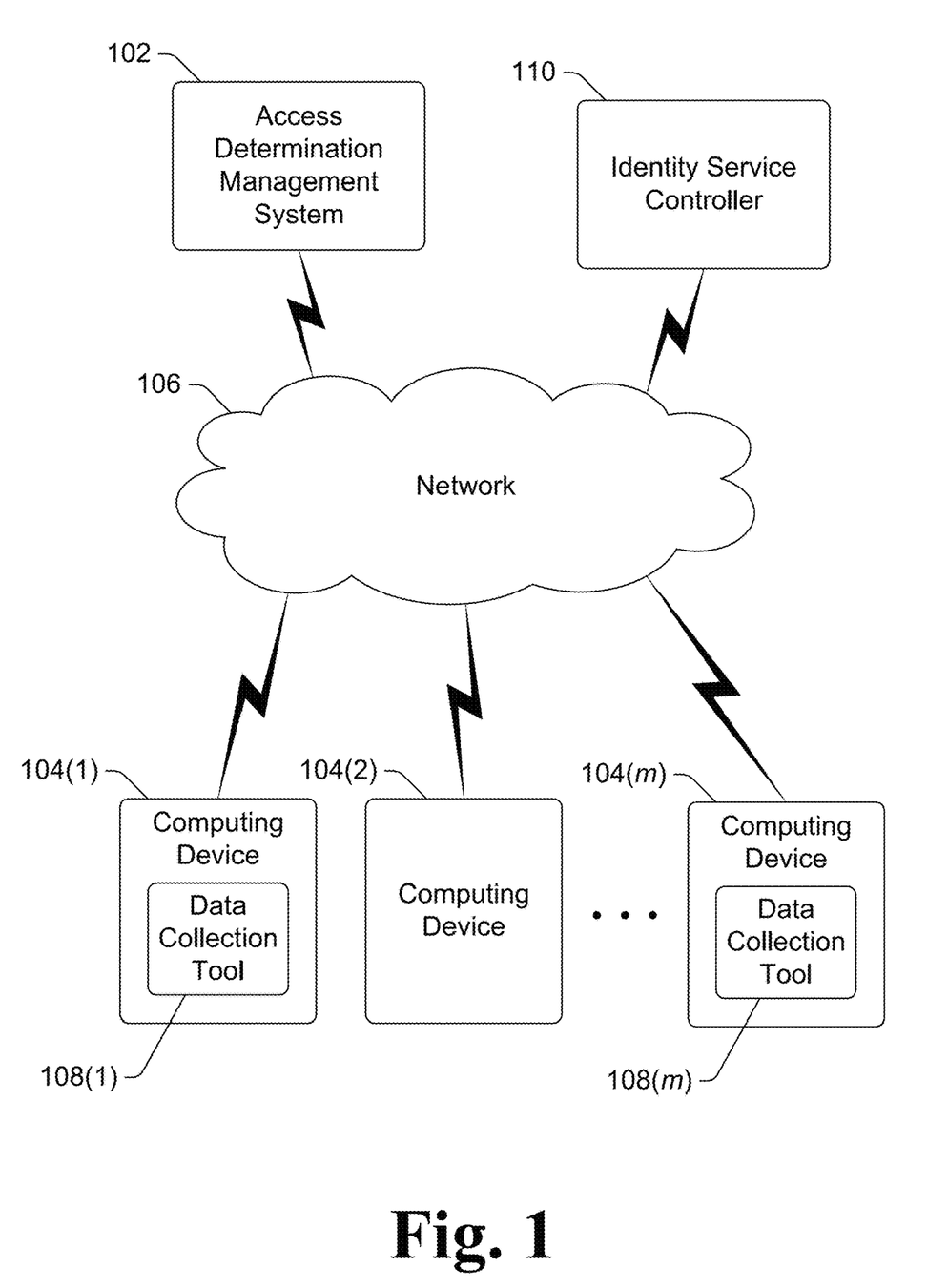
FIG. 1 illustrates an example environment or system implementing the principal access determination in an environment in accordance with one or more embodiments.

FIG. 1 illustrates an example environment or system 100 implementing the principal access determination in an environment in accordance with one or more embodiments. System 100 is also referred to as an environment (e.g., a computing environment) and includes an access determination management system 102 that can communicate with one or more (m) computing devices 104(1), . . . , 104(m) via a network 106. Network 106 can be a variety of different networks, including the Internet, a local area network (LAN), a public telephone network, an intranet, other public and/or proprietary networks, combinations thereof, and so forth.

Each computing device 104 can be a variety of different types of devices, such as a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet), an entertainment device (e.g., an entertainment appliance, a set-top box communicatively coupled to a display device, a game console), Internet of Things (IoT) devices (e.g., objects or things with software, firmware, and/or hardware to allow communication with other devices), a television or other display device, an automotive computer, and so forth. Thus, each computing device 104 may range from a full resource device with substantial memory and processor resources (e.g., personal computers, game consoles) to a low-resource device with limited memory and/or processing resources (e.g., traditional set-top boxes, hand-held game consoles). Different ones of computing devices 104 can be the same or different types of devices.

The access determination management system 102 is implemented using one or more computing devices. Each of the computing devices used to implement the access determination management system 102 can be any of a variety of different types of computing devices (e.g., any of the types of computing devices discussed with reference to the computing devices 104). In situations in which the access determination management system 102 is implemented using multiple computing devices, those multiple computing devices can include computing devices of the same and/or different types.

The access determination management system 102 facilitates the discovery of access in a managed domain that includes the multiple computing devices 104, and provides the pivot paths (paths transiting different principals) used to obtain the desired access to a target principal. The access determination management system 102 identifies a privileged access path to a principal, generally a computer, allowing evaluation of host authorization controls. In practice, the access determination management system 102 can be used, for example, to help penetration testing teams find weaknesses in the associations of users to administrative privileges in the system 100. This information can be used to simulate the path(s) a real attacker might use to compromise the system 100. In addition, the access determination management system 102 can also help defense teams identify potential risk when a user or host is compromised. The access determination management system 102 can further aide in proactively examining the risk exposure of the environment 100.

The access determination management system 102 assumes that transitions through other principals between a source principal and a target principal can occur given an appropriate level of access to an entity. Accordingly, for example, the access determination management system 102 assumes that a privileged principal (such as a user with administrative privileges) on a computing device can impersonate any other user on the computing device as well as the computing device itself, enabling access to other principals to which the impersonated principal has access. Since each principal in an environment will typically have access to numerous other principals (e.g., a user of a computing device may have access to other computing devices, for instance), a graph of principals whose member principals have (or are presumed, inferred, or specifically attributed to have) access to other principals can be generated.

The computing devices 104 can be any of a variety of different types of devices as discussed above, including individual user computing devices and server devices. For example, the computing devices 104 can include the individual desktop, laptop, smartphone, and similar devices used by various individuals, as well as one or more server devices that manage or maintain the environment (e.g., a corporate domain or network manager). The access determination management system 102 accesses the computing devices 104 via the network 106, collecting various different information from the computing devices 104. This information is various different information regarding access that a user of the computing device 104 and/or the computing device 104 itself has in the environment.

In one or more embodiments, one or more of computing devices 104 also has a data collection tool 108(1), . . . , 108(m). The data collection tool 108 on a particular computing device 104 collects various different information regarding users of that computing device 104 and/or the computing device 104 itself, and provides the collected information to the access determination management system 102. Additionally, at least one computing device 104 need not include a data collection tool 108, such as computing device 104(2). Information regarding a computing device that does not include a data collection tool 108 can be obtained in other manners, such as from other computing devices (e.g., information that data collection tool 108(1) running in computing device 104(1) has about computing device 104(2)), from the operating system or other program running on the computing device (e.g., running on the computing device 104(2)), and so forth.

In one or more embodiments, the environment 100 also includes an identity service controller 110. The identity service controller 110 manages or implements an identity system or access management system used by one or more of the computing devices 104, such as by providing authentication controls and managing authorization of users and/or computing devices in the environment 100. The identity service controller 110 can be, for example, a server device implementing an Active Directory® service. The access determination management system 102 can obtain various information regarding principals in the environment 100 from the identity service controller 110.

Figure 2:
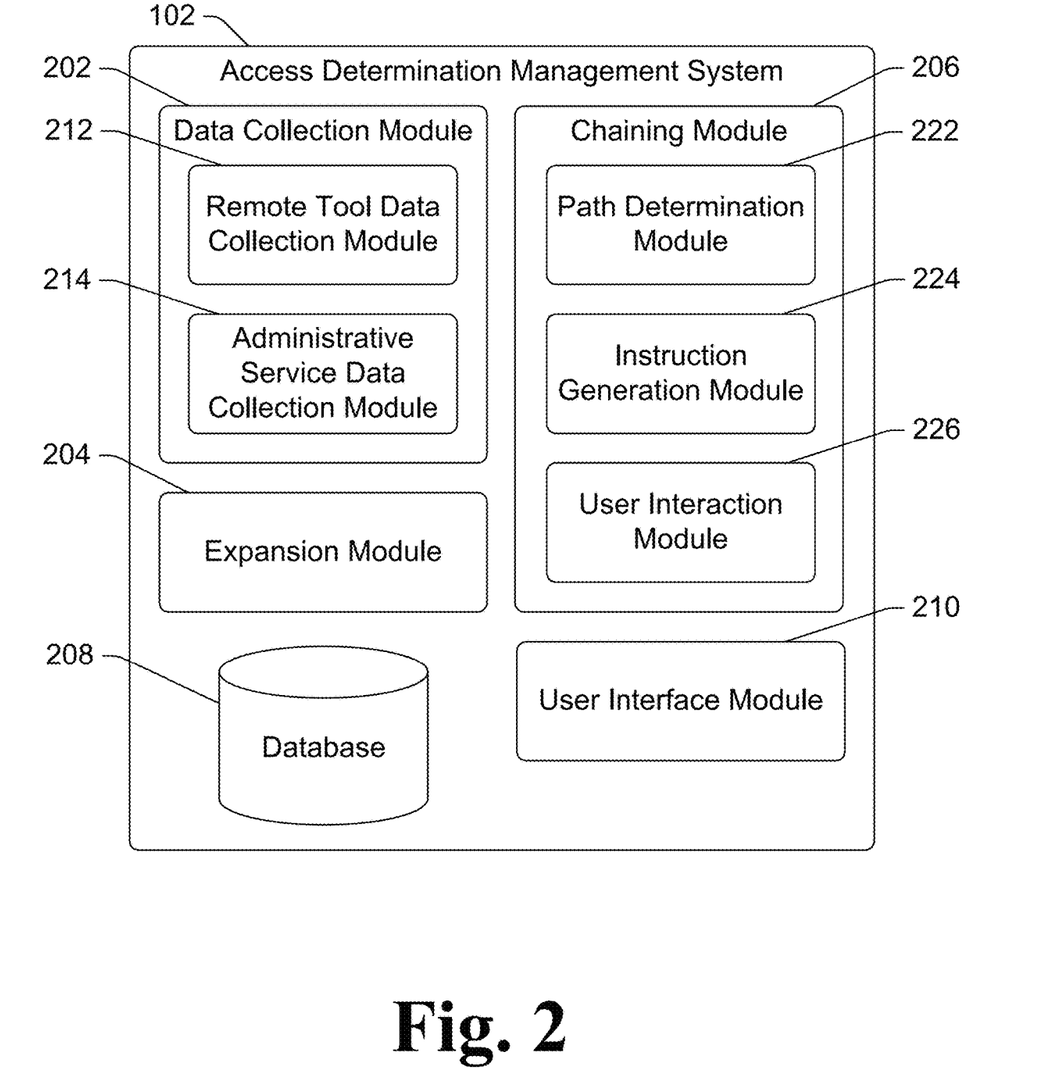
FIG. 2 illustrates an example access determination management system in accordance with one or more embodiments.

FIG. 2 illustrates an example access determination management system 102 in accordance with one or more embodiments. The access determination management system 102 includes a data collection module 202, an expansion module 204, a chaining module 206, a database 208, and a user interface module 210. The data collection module 202 includes a remote tool data collection module 212 and an administrative service data collection module 214.

The remote tool data collection module 212 communicates with data collection tools on remote computing devices, such as data collection tools 108 of FIG. 1. The data collection tools can have been previously installed on the remote computing devices, or alternatively can be installed by the access determination management system 102. Alternatively, rather than installing the data collection tool on a computing device, the data collection tool can be downloaded to and run at the computing device without installation (e.g., as a script). Although discussed as separate tools, the data collection tools 108 on the remote computing devices can be considered to be part of the access determination management system 102.

Each data collection tool 108 running on a computing device 104 obtains a list of principals for the computing device. The principals for the computing device refer to user identities (e.g., user accounts or user names that are used to log into the computing device) as well as the computing device (e.g., an identifier of the computing device itself). The principals for the computing device also optionally include services that the computing device accesses (e.g., an identity of a service in the system 100). Each data collection tool 108 running on a computing device 104 also obtains a list of group information that identifies membership associations for the principals (e.g., the users of the computing device and/or the computing device itself). The list of group information is a list of indications of which principals are members of which groups on the computing device. The data collection tool 108 can obtain these lists of information in various different manners based on the operating system running on the computing device. For example, these lists of information can be obtained from an operating system of the computing device or from an identity system of or used by the computing device (such as an Active Directory® service).

Additionally or alternatively, the remote tool data collection module 212 (or another module of the data collection module 202) can obtain information from sources other than the data collection tool 108. For example, information regarding some principals (e.g., identifiers of computing devices) can be obtained from the identity service controller 110 rather than from the data collection tool 108.

The data collection module 202 supports different domains managed by the identity service controller 110. An administrator of the identity service controller can configure the identity service controller to support multiple different domains in the system 100 based on the desires of that administrator. Each of these domains is a collection of principals or principal identities (e.g., an Active Directory® service domain). An identity service controller (e.g., an Active Directory® service controller) is accessed to collect the domain information (e.g., which domains have trust with which other domains). The identity service controller can be accessed by a module of the data collection module 202, or alternatively another component (e.g., a data collection tool 108).

In one or more embodiments, the data collection module 202 collects information from multiple access management systems, including those with independent scope. These different access management systems can be implemented in different manners, such as different domains. For example, the environment can include a collection of multiple domains, which is also referred to as a forest. The environment can also include multiple different forests. Different domains and/or different forests can have different security trust relationships (e.g., rights and privileges). A module of the data collection module 202 collects data for each of these multiple domains, allowing the graph generated by the chaining module 206 as discussed below to include objects from different domains. Alternatively, data for each of these multiple domains can be collected by a data collection tool 108).

Additionally, in one or more embodiments, the identity service controller 110 supports the notion of an association that transits privilege scopes, such as a foreign security principal. An association that transits privilege scopes allows one identity to perform operations or tasks in the other privilege scope (e.g., allows a user without administrative privileges to perform operations or tasks in another principal's privilege scope (which may include administrative privileges)). These associations that transit privilege scopes are also identified by the data collection tool 108 (e.g., from the identity service controller 110), or by a module of the data collection module 202 communicating with the identity service controller 110, and a list of these associations is provided to the remote tool data collection module 212.

In one or more embodiments, each data collection tool 108 also queries, at regular or irregular intervals, an identity system of or used by the computing device (e.g., an Active Directory® service) for the last logon information for the computing device that logs into the identity system. Network addresses (e.g., Internet Protocol (IP) addresses) from this last logon information are resolved to their corresponding host names (e.g., entity identifiers of computing devices).

In one or more embodiments, the data collection tool 108 is run on each computing device 104 as a low-privilege process. That is, rather than a high-privilege process (e.g., a process run from a higher privileged user identity, such as a user identity with administrative privileges), the data collection tool is run as a low-privilege process without such administrative or other higher level privileges. This allows the data collection module 202 to collect data without injecting additional risk into the system 100 that may occur if running a higher level privilege. For example, the data collection tool itself cannot be compromised (e.g., by malware or a malicious user) to adversely affect the system 100 because the data collection tool itself is run as a low-privilege process and does not have high privilege access to processes or components of the system 100.

In one or more embodiments, the data collection module 202 also includes an administrative service data collection module 214, which is also referred to as a scanner or administrative scanner. The administrative service data collection module 214 communicates with each remote computing device 104 in the system 100 to obtain a list of the groups on that computing device of which a user identity may be a member, as well as which user identities are members of which groups. In one or more embodiments, the administrative service data collection module 214 communicates with each remote computing device 104 as a low-privilege connection (e.g., the administrative service data collection module 214 does not have elevated privileges on the remote computing devices 104).

In one or more embodiments, the list of groups includes an indication of which user identities have administrative privileges on the computing device. Different users can have different privilege levels, with administrative privileges being one of the higher (and typically the highest) privilege levels. Users with higher privilege levels are able to perform additional operations on the computing device than users with lower privilege levels. For example, a user with administrative privileges may be able to change the privilege level of another user, change a password or other user credentials of another user, and so forth.

The administrative service data collection module 214 can obtain the list of groups on a computing device in various different manners. In one or more embodiments, the operating system running on each computing device supports calls from a remote device requesting group information (e.g., other devices that are in the same system 100), and responds to such calls with a listing of the groups and the user identities that are members of those groups. Alternatively, a separate program may be run on each computing device to collect the list of groups and the user identities that are members of those groups, and return the collected list to the administrative service data collection module 214. This separate program can be, for example, the data collection tool 108 of FIG. 1.

Thus, the data collection module 202 obtains lists of information identifying the user identities on the computing device on which the data collection tool is running (user identities that can log into the computing device regardless of whether any such user identity is currently logged into the computing device), and information identifying which groups each such user identity is a member of (including which user identities have administrative privileges).

The data collection module 202 optionally collects various other types of information regarding the rights or privileges that principals have. In one or more embodiments, an external management system supports a temporary or "just in time" right or privilege. Rights or privileges typically granted to a principal can be referred to as permanent rights or privileges, which remain granted to the principal until changed by that principal or another principal. A temporary or "just in time" right or privilege, however, is a right or privilege granted to the principal for a limited amount of time (e.g., a 5 minutes, 2 hours, etc.), typically by an external management system. Once that amount of time elapses, the principal no longer has that right or privilege. For example, rather than having permanent administrative privileges to a computing device, a user identity may be granted temporary administrative privileges to the computing device, and after a particular amount of time elapses the administrative privileges are revoked for the user identity.

The data collection module 202 optionally collects information regarding the temporary or "just in time" rights or privileges. The data collection module 202 can collect this information in various manners, such as communicating a request for the information to the external management system. If information indicating a right or privilege of a principal is obtained by the data collection module 202 (e.g., by the remote tool data collection module 212 or the administrative service data collection module 214) and information indicating that right or privilege is a temporary or "just in time" right or privilege is also obtained, then the right or privilege can be flagged or otherwise identified (e.g., in the database 208) as being temporary or "just in time".

Various additional metadata can also be collected by the data collection module 202. The metadata can be collected as part of the collection of other data, such as by the remote tool data collection module 212 or the administrative service data collection module 214, as discussed herein. The metadata can be metadata regarding a principal, metadata regarding a right or privilege of a principal, combinations thereof, and so forth. The metadata can be any additional data or information describing a principal, describing an access one principal has to another, describing how useful or valuable a link between two principals is, describing a cost or effectiveness of a link between two principals, and so forth. The metadata can include, for example, a friendly name of a principal (e.g., the name of computing device), a security configuration of a principal (e.g., which policies are applied to the principal), permissions on a principal (e.g., which groups have write permission to a principal), an employee identifier for a principal, account status for a principal (e.g., whether a user's account is disabled), access control lists (ACLs) for a principal (e.g., ACLs on a file share of a principal), and so forth.

This metadata can also include various other types of data that a principal may have access to. For example, firewall access control lists that may impede the ability to traverse a network (e.g., and follow a path from one object to another) can be included in the metadata. Link viability (e.g., what type of protocol can be used to access one principal from another, e.g., whether Remote Desktop Protocol (RDP) or some other protocol can be used) can be included in the metadata.

The information collected by the data collection module 202 is stored in the database 208. The database 208 can be implemented using any of a variety of volatile and/or nonvolatile memory. For example, the database 208 can be implemented using Flash memory or magnetic disks, and some data can optionally be copied into random access memory (RAM) at various times for use by the data collection module 202, expansion module 204, and/or chaining module 206.

The expansion module 204 expands the paths between the principals, generating a record (e.g., a list or database) indicating, for each principal, every other principal that the principal has access to or is a member of. The expansion module 204 generates this record by analyzing the various data obtained by the data collection module 202. The expansion module 204 stores this record in, for example, the database 208.

In one or more embodiments, the expansion module 204 also expands group memberships. Given a particular individual membership in a group, all possible chains (all possible entities that can be accessed) for that individual membership are identified. A record of these memberships is maintained, allowing the various different paths from that individual member to other principals to be quickly retrieved without needing to be recalculated if subsequently requested.

In one or more embodiments, the expansion module 204 also correlates direct and indirect administrative privileges. This includes, for example, identifying which user identities have administrative privileges directly, and which user identities have administrative privileges indirectly (e.g., as a result of being a member of or having access to another entity that has administrative privileges).

In one or more embodiments, in a forest (e.g., an Active Directory® service forest), the relationship between computing devices is determined using regular user accounts, service accounts, and service principal names (SPNs). The expansion module 204 selects a seed principal (such as a user, service, or computing device account), determines that principal's access rights and also determines the access rights of related principals. For example, given a domain user, the expansion module 204 determines the domain computing devices the user has access to and the users of those computing devices. The expansion module 204 then enumerates the computing devices to which those users have access, enumerates the users of those computing devices, enumerates the computing devices to which those users have access, and so on. This allows the chaining module 206 to generate a graph of the relationship between users and computing devices in the domain. This process is repeated for each domain in a forest. Access that a principal in one domain has to a principal in another domain allows the expansion module 204 to include cross-domain relationships in the expansion. In situations in which a system includes multiple forests, access that a principal in one forest has to a principal in another forest allows the expansion module 204 to include cross-forest relationships in the expansion.

The chaining module 206 uses the record generated by the expansion module 204 to generate a graph that includes multiple objects and links between the objects. This graph can be displayed to a user of the access determination management system 102 on a screen or other display device by the user interface module 210. Each object represents a principal in the system (e.g., a user, computing device, etc. as discussed above). Each link represents a right or privilege that one principal has with respect to another (e.g., access that one entity has to the other). This graph is displayed by the access determination management system 102, allowing a user of the access determination management system 102 to readily see principals in the system and, for a given principal, what other principals in the system the given principal has rights or privileges to and thus may be a source of attack.

The chaining module 206 can use various different types of links. In one or more embodiments, the links include one principal being a member of another principal (e.g., a user is a member of a group, a group is a member of a group), and one principal having administrative privileges to another principal (e.g. a user is an administrator on a computing device). Additionally or alternatively, the links include whether one principal has access (e.g., write access or modify access) to another principal (e.g., a user has access to a group policy, a group has access to a group policy).

Various other types of links can optionally be used by the chaining module 206. In one or more embodiments, the links include a temporary or "just in time" link, which indicates that the right or privilege is a temporary or "just in time" privilege.

Figure 3:
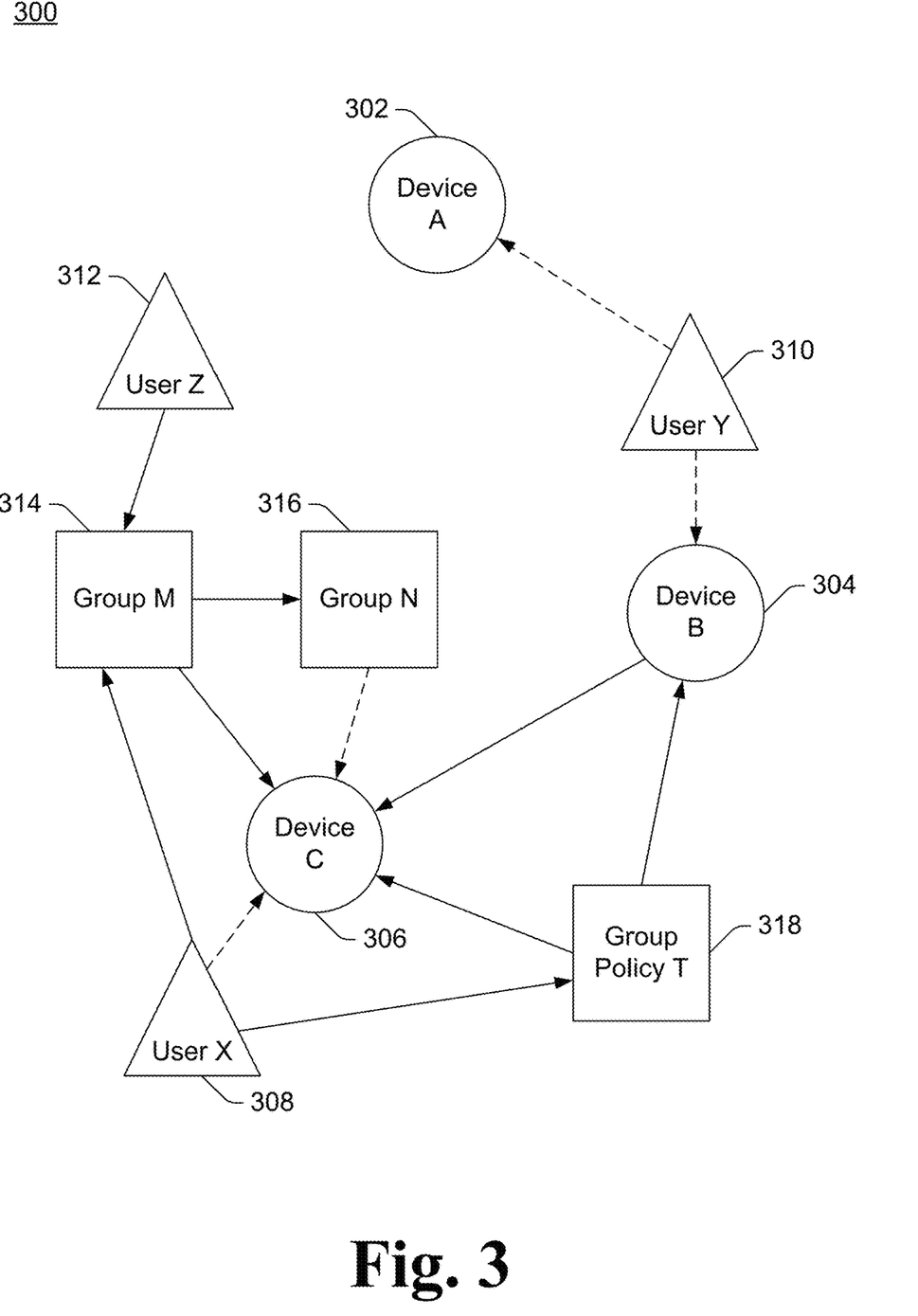
FIG. 3 illustrates an example graph in accordance with one or more embodiments.

FIG. 3 illustrates an example graph 300 in accordance with one or more embodiments. The graph 300 includes different objects for different entities. Objects for different principals are illustrated in the graph 300 as being different geometric shapes, such as circles for computing devices, triangles for users, and so forth. This allows the user to readily identify the different principals in the graph 300. Additionally or alternatively, other display differences can be used for different types of principals, such as different colors, different sizes, and so forth. For example, rather than different geometric shapes, the same geometric shape (e.g., a circle) but different colors can be used for both computing device principals and user principals, such as red for computing devices principals and blue for user principals.

In the graph 300, three device principals Device A, Device B, and Device C are shown as objects 302, 304, and 306, respectively. Three user entities User X, User Y, and User Z are shown as objects 308, 310, and 312, respectively (these can be, for example, different user identities). Group entities Group M and Group N are shown as objects 314 and 316, respectively, and a group policy entity Group Policy T is shown as object 318. The group and group policy principals are shown with same geometric shape, although alternatively the group and group policy principals can be displayed with different geographic shapes (or different colors, or other different characteristics to distinguish groups from group policies).

Links between the objects show rights or privileges that one object has with respect to another object (the rights or privileges that a principal represented by one object has with respect to a principal represented by another object). All links can be displayed in the same manner, or different links for different types of rights or privileges can be displayed. For example, links with solid lines can be used to display one type of rights or privileges and links with dashed lines can be used to display another type of rights or privileges. By way of another example, links of one color can be used to display one type of rights or privileges and links with another color can be used to display another type of rights or privileges.

In the illustrated example graph 300, dashed lines are used to show an object having administrative privileges on another object, and solid lines are used to show other rights or privileges. By way of example, User Y has administrative privileges on Device B (as shown by the dashed line between object 310 and object 304) as well as Device A (as shown by the dashed line between object 310 and object 302). By way of another example, Group M is a group on Device C (as shown by the line between object 314 and object 306) and Group N is a group on Device C having administrative privileges on Device C (as shown by the dashed line between object 316 and object 306).

Additionally, User Z is a member of Group M (as shown by the line between object 312 and object 314), User X is a member of Group M (as shown by the line between object 308 and object 314), and Group M is a member of Group N (as shown by the line between object 314 and object 316). By way of another example, Group Policy T applies to Device C (as shown by the line between object 318 and object 306) as well as Device B (as shown by the line between object 318 and object 306), and User X has access to Group Policy T (as shown by the line between object 308 and object 318).

The chaining module 206 considers direct access and indirect access when building a graph. Direct access refers to access in which one principal (referred to as a source principal) has access to another principal (referred to as a target principal), is a member of a group of principals, or is otherwise associated with a target principal, such that the source principal has the potential to impersonate the target principal. In these cases, the source principal is considered to have direct access to the target principal. Indirect access refers to target principal access that can be obtained by transitioning (or pivoting) from a source principal to a target principal through one or more intermediate, connected principals. In one or more embodiments, display of access in a connected graph is scoped to administrative permissions as these are typically the most powerful privileges of an autonomous object and provide access transitions between principals more readily, although other rights or privileges can additionally or alternatively be displayed in the graph.

The graph 300 allows a user of the access determination management system 102 to readily identify which objects have access to (e.g., rights or privileges on) which other objects, and thus identify paths that can be used to access a computing device. By way of example, using the graph 300 it can be readily seen that User Y does not have direct access to Device C. However, it can also be seen that User Y has administrative privileges on Device B, which has access to Device C, and thus Device B could be used as a pivot for User Y to get access to Device C. By way of another example, using the graph 300 it can be readily seen that User Z does not directly have administrative privileges on Device C (e.g., the user identity for User Z has not explicitly been given administrative privileges). However, it can also be seen that User Z is a member of Group M, Group M is a member of Group N, and Group N has administrative privileges on Device C. Thus, although User Z has not been given direct or explicit administrative privileges on Device C, User Z does in fact have administrative privileges on Device C due to the path from object 312 to object 314 to object 316 to object 306.

The displayed graph thus allows a user of the access determination management system 102 to readily see transitive associations within the system. Thus, even though one object may not have direct access to another object, the ability to transit through one or more intermediary objects (which may also be referred to as pivot objects) can be readily identified.

In one or more embodiments, the chaining module 206 includes a path determination module 222 that determines a path between two objects in the graph. The path determination module 222 can use any of a variety of public and/or proprietary techniques to determine the path between two objects. For example, in one or more embodiments, the path determination module 222 uses Dijkstra's algorithm to determine the shortest path between two objects in the graph. However, it should be noted that Dijkstra's algorithm is an example and that other algorithms or techniques can also be used. In one or more embodiments, the path is determined in response to a user request for a path between two objects (e.g., from a source principal to a target principal).

The path determination module 222 optionally assigns a weight or cost to links between objects, in which case the algorithm used to determine the path between two objects in the graph is also referred to as a weighted shortest path algorithm. Some links have a lower effort or cost to transit, which refers to the amount of effort or difficulty a user would encounter in using that link to access the linked-to object. For example, a link from a user to the group they're a member of is a low cost or effort link, whereas another link that is one computing device being an administrative user of another computing device is a higher cost or effort due to the need to get around credential theft (credentials to access the other computing device).

The particular weight that the path determination module 222 assigns to a particular link can be determined in a variety of different manners. In one or more embodiments, the path determination module 222 is pre-configured with different weights for different links by a designer or administrator of the access determination management system 102. Additionally or alternatively, the path determination module 222 can obtain the weights from an external source (e.g., another device or service), from a user of the access determination management system 102 during running of the access determination management system 102 (e.g., via user preference settings of the access determination management system 102), and so forth.

In one or more embodiments, the chaining module 206 uses links including a temporary or "just in time" link, which indicate that a right or privilege is a temporary or "just in time" privilege. Temporary or "just in time" links can be given a high cost or weight because they are not permanent and thus are considered less reliable to use (e.g., less likely to be available) to access an entity than a permanent link.

The chaining module can identify a path determined by the path determination module 222 in different manners, such as using different colors, using animation using different intensities or brightnesses, and so forth.

Figure 4:
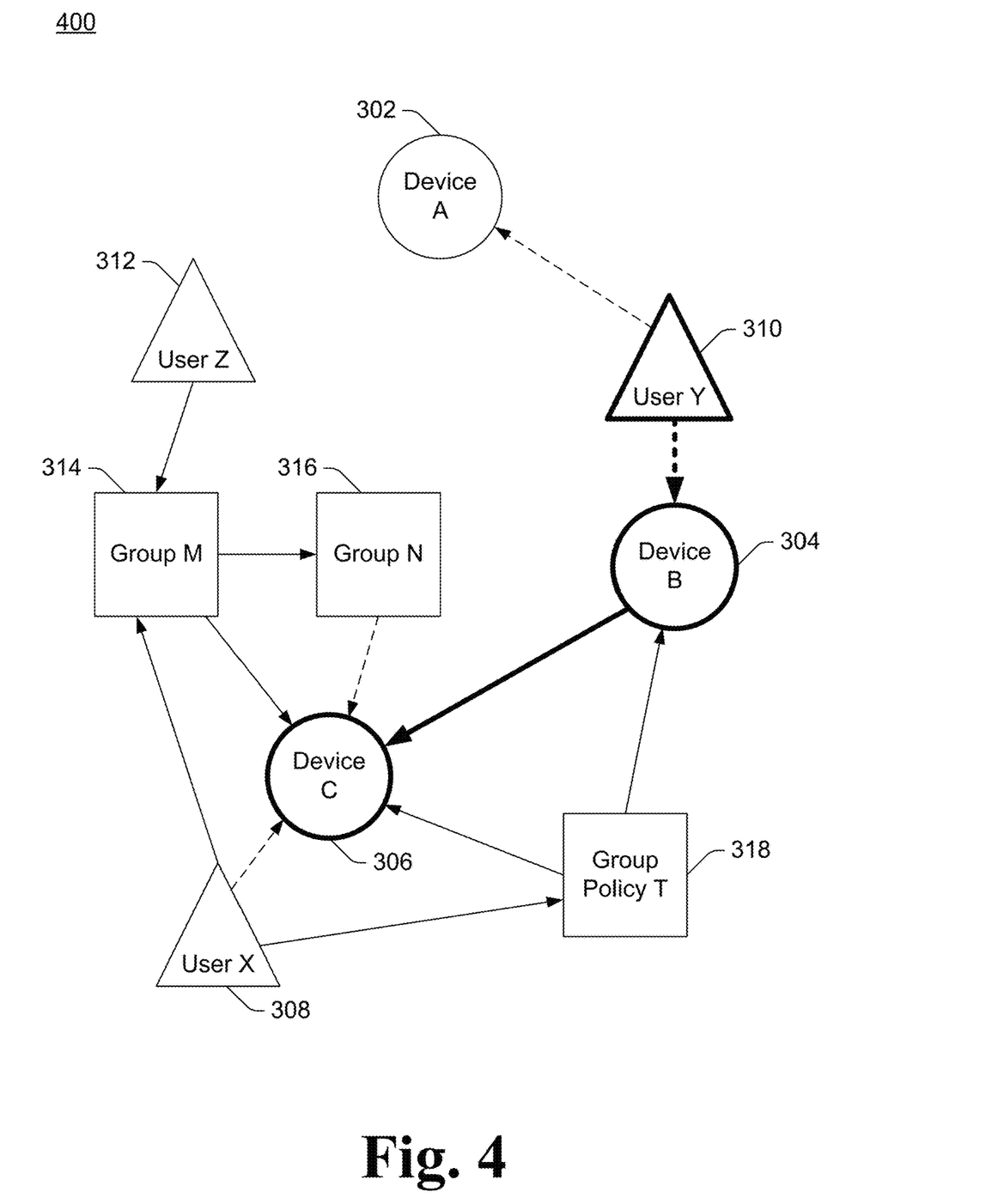
FIG. 4 illustrates an example graph in accordance with one or more embodiments.

FIG. 4 illustrates an example graph 400 in accordance with one or more embodiments. The graph 400 includes different objects for different entities. The graph 400 is the graph 300 of FIG. 3, except that a path determined by the path determination module 222 is identified. The path determined by the path determination module 222 is identified using thicker lines than other paths, although the identification can alternatively be made in different manners. Thus, as shown in FIG. 4, a path from a source principal (represented by object 310) to a target principal (represented as object 306) is through Device B (represented by the object 304).

Returning to FIG. 2, in addition to determining a path between two objects, the path determination module 222 can identify multiple paths. For example, a user may input a request for all of the computing devices that a particular user has access to. The chaining module 206 can make that determination based on the various collected information and display a new graph (e.g., a sub-graph) that includes just an object for the user, objects for each computing device that the user has access to, and any other objects in the path between the object for the user and the objects for each computing device that the user has access to. Alternatively, rather than displaying a new graph, the object for the user, the objects for each computing device that the user has access to, and any other objects in the path between the object for the user and the objects for each computing device that the user has access to can be displayed in a different manner (e.g., a different color, a different size, a different intensity or brightness, and so forth).

The chaining module 206 can use any of a variety of additional information in generating a graph, and the path determination module 222 can use any of a variety of additional information in determining a path in the graph. In one or more embodiments, metadata collected by the data collection module 202 as discussed above is used to generate the graph and/or determine a path in the graph. The metadata can be used, for example, to determine a cost or weight of a link. Various rules or criteria can be applied by the chaining module 206 to determine the cost or weight of a link given particular metadata. The metadata can also be used to determine how to display a link (e.g., links to or from a disabled account may be displayed differently). Various rules or criteria can be applied by the chaining module 206 to determine how to display a link given particular metadata. The chaining module 206 also optionally includes the metadata itself as part of the graph. For example, friendly names or other information describing objects, rights or privileges, etc. can be displayed on the graph.

The chaining module 206 can also use information regarding ACLs for an object. The information can be used to change the manner in which the object is displayed, a link to or from an object is displayed, additional information describing the object that is displayed, and so forth. For example, an object (e.g., a computing device) may host a file share with a misconfigured ACL that allows any user or a specific user via security membership to access an executable that's sitting on the file system, and the object may be running that executable as a high-privileged identity on the computing device. A user could come in from the network and modify that executable as a non-administrator user, but because the user can modify that executable the user now has the ability to elevate his or her privilege on the machine and become privileged. Thus, even though the user being a member of an administrator group may be a normal way that administrative permissions are granted on the computing device, configuration changes can explicitly or accidentally be made to allow other ways for a user to become an administrator on the computing device or have other levels of access on the machine that would not be expected. The chaining module 206 can include these possible misconfigurations and display the resultant links as part of the graph.

The information regarding objects optionally includes information regarding group policies as discussed above. A group policy is a way for an administrator of a system to manage configuration settings for computing devices in the system. The administrator defines the group policy, which is provided to and implemented by the various computing devices in the system. The group policy can have an ACL that indicates which entities (e.g., which users) have access to make changes to the group policy. So, instead of having a user compromise or have administrative privileges to a computing device, the user may have the right to a group policy that then has the right to make changes or compromise the computing device. So, the user has access to something (the group policy) that has the ability to control an entity (e.g., a computing device). By including the group policies as objects in the graph, the chaining module 206 allows these possible scenarios to be identified. E.g., a user can readily see which users have access to which group policies.

The chaining module 206 can also use various additional information collected by the data collection module 202 to generate the graph, determine what objects or links to display in the graph, and/or to determine paths in the graph. This additional information can include network ACLs, firewall restrictions, which ports are open on computing devices, which services are running on computing devices, and so forth. This additional information can render links viable, unusable, traversal more or less challenging (and thus higher or lower weight), and so forth.

In one or more embodiments, the chaining module 206 also allows user modifications or changes to the graph. The chaining module 206 optionally includes a user interaction module 226 via which the user can input various changes he or she desires. These changes can be creating new links, removing links, creating new objects, removing objects, and so forth. A record of these changes can be maintained (e.g., newly created links can be flagged), allowing the changes to be readily removed (e.g., undone) when desired.

For example, a user can request a change to a graph to say he or she wants to remove a particular link and/or add a new link, and then see how access changes in response to those links. E.g., a user may input a request to see what computing devices the user has access to, then request a change to remove a link and/or add a new link (e.g., to make the user a member of a group or remove the user from a group), and then again request to see what computing devices the user has access to. So, the user can readily understand how changes to the links impact the access level of a user.

By way of another example, a user may desire to add another group of users with administrative privileges to the system. Rather than just looking at the direct membership of that group, the user can input a request to have an object for that group added to the graph, and then see how that change affects access in the system. Given the users that are part of the group, adding another group of users with administrative privileges may have unforeseen results that can be readily identified using the graph.

Similarly, the chaining module 206 optionally allows similar user modifications or changes to the collected data used to generate the graph. For example, the user can provide input to change ACLs, to change particular rights or privileges, and so forth.

In one or more embodiments, the chaining module 206 allows for expansion to accommodate new types of access. For example, assume a new type of access to a computing device is identified (e.g., a new way to compromise the computing device is identified). The remote tool data collection module 212 and the administrative service data collection module 214 collect data related to this new type of access, and the chaining module 206 uses the collected data to generate new links in the graph reflecting the new type of access. All of the data collection need not be repeated, just collection of data related to this new type of access. The chaining module 206 can also optionally (e.g., in response to a user request) display these new links in a particular manner (e.g., a particular color, with a particular intensity, etc.) to highlight these new links and paths to the user.

For example, after the initial data collection and display of the graph, a new way to access an entity may be identified. E.g., it could be a service listening on some port, a computing device running software with a compromise in it, and so forth. The data collection module 202 communicates with the appropriate principals to collect information to determine whether they are affected by this new way to access an entity. For example, if the new way to access a principal is a service listening on a particular port, then the data collection module 202 accesses services in the system to collect information regarding whether the services are listening on that particular port. By way of another example, if the new way to access a principal is a computing device running software that has been compromised, then the data collection module 202 accesses computing devices in the system to collect information regarding whether they are running that compromised software.

Thus, the access determination management system 102 is dynamic, adapting to new types of access that are identified after initial data collection is performed.

The chaining module 206 supports multiple different ways in which the graph (or portions thereof) can be displayed, and the user interaction module 226 allows user selection from among these different ways. For example, the chaining module 206 supports displaying a subset of the graph that includes the objects a selected principal has direct privileged access to, displaying a subset of the graph that includes the objects a principal has indirect privileged access to, displaying a subset of the graph that includes objects a principal has access to or can obtain access to, displaying a subset of the graph that includes the principals required to obtain access to an object (e.g., principals in the path to the object), displaying a subset of the graph that includes the shortest sequence of compromise (e.g., the weighted shortest path) to obtain access to a target object, and so forth.

In one or more embodiments the access determination management system 102 supports generation of a set of instructions that attempts to automatically verify a path between a source principal and a target principal. The set of instructions can take various forms, such as a script, an executable file, and so forth. The set of instructions is automatically generated by, for example, an instruction generation module 224 of the chaining module 206. Verification of a path refers to attempting to use each link along the path to access the object indicated by the path and verify that the path can actually be used to access the target principal. Despite the presence of the links, the path may not actually allow access to the target principal due to various other mechanisms in place (e.g., network access controls that prohibit the access). Thus, various additional mechanism in the system may prevent a path from being exploited.

The instruction generation module 224 allows a user to select a path between a source principal and target principal, and have a set of instructions generated that automatically verifies the path between the source principal and the target principal. The path can be selected or identified in a variety of different manners, and can be a path determined by the path determination module 222 or otherwise selected (e.g., touched, clicked on, etc.) by the user.

In one or more embodiments, to generate the set of instructions, a type of remote procedure call (RPC) to use at each device to access the next device along the path is specified. The type of RPC can be specified in different manners, such as by the user, by the path determination module 222 itself, e.g., by using random or pseudo random selection, selecting the type of RPC so that multiple set of instructions are generated each using a different type of RPC, and so forth. Examples of types of RPCs include PsExec, Windows Management Instrumentation (WMI), PowerShell remoting, and so forth. The path determination module 222 generates, for each link, a set of instructions that can be used at one principal (e.g., the principal represented by the linked-from object) to another principal (e.g., the principal represented by linked-to object) using the specified type of RPC. The path determination module 222 optionally includes various additional information in the set of instructions as appropriate for the specified type of RPC, such as specifying the principal represented by the linked-from object so that the identity of the user (or the source principal for the path) changes as the path is transited.

The path determination module 222 generates different sets of instructions for different principals along the path, verifying each link along the path. The set of instructions for the last link in the path, in which the principal represented by the linked-to object is the target principal, also optionally specifies a command to be run on the target principal. The command can be specified in different manners, similar to the specification of the type of RPC, such as by a user, using various rules or criteria of the path determination module 222, and so forth. For example, the command may be to request an interactive shell, to add a new user to a group, to run a program (included in the set of instructions or already on or available to the target principal), and so forth.

The techniques discussed herein thus provide support for complex trust or access relationships within a system. If there is a way to access one principal from another, the techniques discussed herein present that to a user regardless of whether it is a typical mechanism such as a user being a member of a group or a less typical mechanism such as pivoting through service accounts, computing device accounts, and so forth. Furthermore, using the techniques discussed herein, a number of small atomic trust or access associations can be connected into a larger set of associations. So, there may be a group membership, an administrative membership, a group policy configuration, a just in time membership, and all of these are pulled together and the complex collection of all of these is displayed to the user rather than the user being forced to look at just sub-parts of the system.

The techniques discussed herein further provide a robust system for collecting data regarding rights and privileges in a system as well as displaying that data to a user. The displayed data provides a comprehensive view to the user of which principals have access to which other principals in the system. The data collection can be performed using low-privilege processes as discussed above, reducing any risk to the system that might be created due to data collection. The data collection can further identify all administrative users in a system (e.g., by enumerating the members of an administrative users group) rather than assuming or inferring which users are administrative users based on their log-on information.

Figure 5:
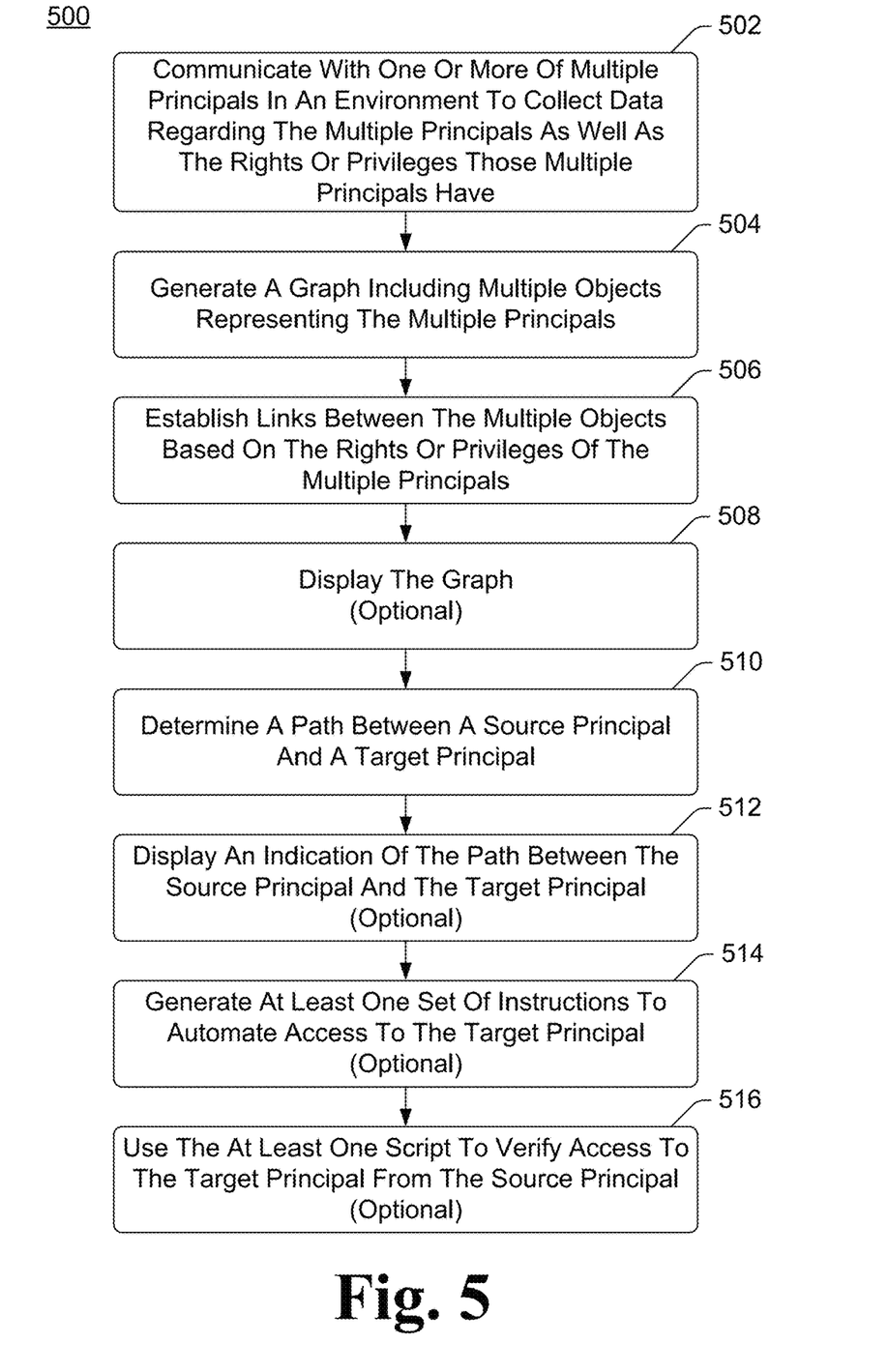
FIG. 5 is a flowchart illustrating an example process for implementing principal access determination in an environment in accordance with one or more embodiments.

FIG. 5 is a flowchart illustrating an example process 500 for implementing principal access determination in an environment in accordance with one or more embodiments. Process 500 is carried out by an access determination management system, such as access determination management system 102 of FIG. 1 or FIG. 2, and can be implemented in software, firmware, hardware, or combinations thereof. Process 500 is shown as a set of acts and is not limited to the order shown for performing the operations of the various acts. Process 500 is an example process for implementing principal access determination in an environment; additional discussions of implementing principal access determination in an environment are included herein with reference to different figures.

In process 500, one or more of multiple principals in an environment are communicated with to collect data regarding the multiple principals as well as the rights or privileges those multiple principals have (act 502). Various different data can be collected as part of this data collection as discussed above.

A graph including multiple objects representing the multiple principals is generated (act 504). When the graph is displayed, different objects can be displayed in different manners based on the types of principals the objects represent.

Links between the multiple objects are established based on the rights or privileges of the multiple principals (act 506). When the graph is displayed, different links can be displayed in different manners based on the types of rights or privileges the links represent.

The graph is displayed (act 508). This display includes displaying the multiple objects and the links between the multiple objects. It should be noted that act 508 is optional, and that the graph need not be displayed. In situations in which the graph is not displayed, process 500 proceeds from act 506 to act 510.

A path between a source principal and a target principal is determined (act 510). The source and target principals can be identified in different manners, such as by a user of the access determination management system. The path between the source principal and the target principal can transit one or more additional principals.

An indication of the determined path between the source principal and the target principal is displayed (act 512). The indication can be a sub-graph that includes just the source principal, the target principal, and any principals in the path between the source principal and the target principal (as well as links between such principals). Alternatively, the indication can be highlighting, changing the color or intensity, etc. of the source principal, the target principal, and any principals in the path between the source principal and the target principal (as well as links between such principals) in the graph displayed in act 508. It should be noted that act 512 is optional, and that the indication of the determined path not be displayed. In situations in which the indication of the determined path is not displayed, process 500 optionally proceeds from act 510 to act 514.

At least one set of instructions to automate access to the target principal is optionally generated (act 514) and used to verify access to the target principal from the source principal (act 516). Verification of access refers to attempting to access the target principal and verify that the path can actually be used to access the target principal as discussed above. It should be noted that acts 514 and 516 are optional, and that the set of instructions to automate access to the target principal need not be generated or used to verify access to the target principal.

It should also be noted that various acts of the process 500 can be repeated. For example, the data collected in act 502 can be persisted, and acts 504-516 (or subsets thereof, such as acts 510 and 512) can be repeatedly performed any number of times using the data collected in act 502.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 6:
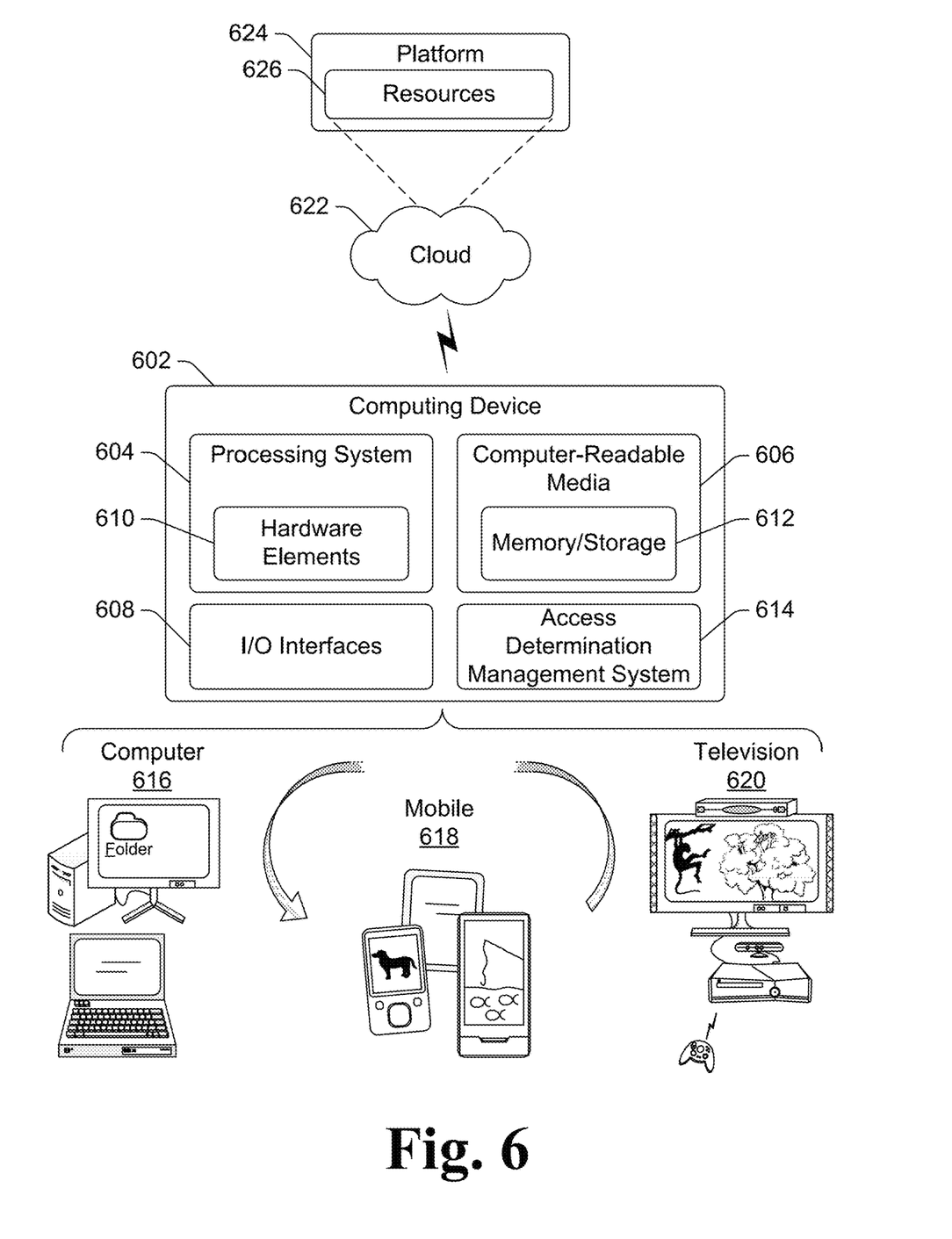
FIG. 6 illustrates an example system that includes an example computing device that is representative of one or more systems and/or devices that may implement the various techniques described herein.

FIG. 6 illustrates an example system generally at 600 that includes an example computing device 602 that is representative of one or more systems and/or devices that may implement the various techniques described herein. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O Interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

The one or more input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

The computing device 602 also includes an access determination management system 614. The access determination management system 614 provides various data collection and graph display functionality as discussed above. The access determination management system 614 can implement, for example, the access determination management system 102 of FIG. 1 or FIG. 2.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as a module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 602 may assume a variety of different configurations, such as for computer 616, mobile 618, and television 620 uses. Each of these configurations includes devices that may have generally different constructs and capabilities, and thus the computing device 602 may be configured according to one or more of the different device classes. For instance, the computing device 602 may be implemented as the computer 616 class of a device that includes a personal computer, desktop computer, a multi-screen computer, laptop computer, netbook, and so on.

The computing device 602 may also be implemented as the mobile 618 class of device that includes mobile devices, such as a mobile phone, portable music player, portable gaming device, a tablet computer, a multi-screen computer, and so on. The computing device 602 may also be implemented as the television 620 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. This functionality may also be implemented all or in part through use of a distributed system, such as over a "cloud" 622 via a platform 624 as described below.

The cloud 622 includes and/or is representative of a platform 624 for resources 626. The platform 624 abstracts underlying functionality of hardware (e.g., servers) and software resources of the cloud 622. The resources 626 may include applications and/or data that can be utilized while computer processing is executed on servers that are remote from the computing device 602. Resources 626 can also include services provided over the Internet and/or through a subscriber network, such as a cellular or Wi-Fi network.

The platform 624 may abstract resources and functions to connect the computing device 602 with other computing devices. The platform 624 may also serve to abstract scaling of resources to provide a corresponding level of scale to encountered demand for the resources 626 that are implemented via the platform 624. Accordingly, in an interconnected device embodiment, implementation of functionality described herein may be distributed throughout the system 600. For example, the functionality may be implemented in part on the computing device 602 as well as via the platform 624 that abstracts the functionality of the cloud 622.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method comprising: communicating with one or more principals in a system to collect data regarding the principals as well as rights or privileges the principals have in the system, the communicating including receiving data regarding the principals from one or more data collection tools running on one or more of the principals; generating a graph including multiple objects, each object representing one of the principals; establishing, in the graph, links between objects in the graph based on the rights or privileges; and determining, using the graph, a path between a source principal in the system and a target principal in the system, the path transiting zero or more additional principals between the source principal and the target principal.

Alternatively or in addition to any of the above described methods, any one or combination of: the method further comprising displaying an indication of the path between the source principal and the target principal; the communicating further comprising communicating with the one or more principals to collect metadata regarding the principals or metadata regarding the rights or privileges the principals have in the system, and the displaying further comprising displaying at least some of the collected metadata; the one or more data collection tools comprising low-privilege data collection tools; the principals including at least one user and at least one computing device; the principals further including at least one group and at least one group policy; the determining the path comprising determining the path using a weighted shortest path technique; the method further comprising generating a script to automate access to the target principal from the source principal; the communicating further comprising communicating with the one or more principals to collect metadata regarding the principals or metadata regarding the rights or privileges the principals have in the system, and the generating the graph comprising generating the graph based at least in part on the collected metadata; the generating the graph comprising generating the graph based on both direct access and indirect access that ones of the multiple principals have to others of the multiple principals; the rights or privileges including an access control list for a principal, and the generating the graph comprising generating the graph based on the access control list for the principal; one of the principals comprising a group principal, and the method further comprising receiving a user request to change which users are members of the group, and re-generating at least part of the graph using the changed group membership; the communicating further comprising communicating with the one or more principals to collect additional information regarding network access control lists and firewall restrictions, and the generating the graph comprising generating the graph based at least in part on the collected additional information by using the collected additional information to determine what links to display between ones of the multiple objects in the graph; the principals including at least one principal in one domain and at least one principal in another domain; the method further comprising communicating with the one or more principals to collect data regarding a new type of access to a principal in the system, generating a new graph including at least one new link based on the new type of access, determining, using the new graph, a new path between the source principal and the target principal using a weighted shortest path technique, and displaying an indication of the new path between the source principal and the target principal.

A system comprising: one or more processors; and one or more computer-readable storage medium having stored thereon multiple instructions that, responsive to execution by the one or more processors, cause the one or more processors to perform acts comprising: communicating with one or more principals in an environment to collect data regarding the principals as well as rights or privileges the principals have in the environment, the communicating including receiving data regarding the principals from one or more data collection tools running on one or more of the multiple principals; generating a graph including multiple objects, each object representing one of the principals; including, in the graph, links between objects in the graph based on the rights or privileges; generating at least one set of instructions to automate access to a target principal in the environment from a source principal in the environment; and using the at least one set of instructions to verify access to the target principal from the source principal.

Alternatively or in addition to any of the above described systems, any one or combination of: the acts further comprising receiving a user request to change one of the principals or one of the links, and re-generating at least part of the graph using the change to the one of the principals or one of the links; the acts further comprising communicating with the one or more principals to collect data regarding a new type of access to a principal in the system, generating a new graph including at least one new link based on the new type of access, determining, using the new graph, a new path between the source principal and the target principal using a weighted shortest path technique, and displaying an indication of the new path between the source principal and the target principal.

A system comprising: a data collection module configured to communicate with one or more principals in an environment to collect data regarding the principals as well as rights or privileges the principals have in the environment, the data collection module receiving data regarding the principals from one or more data collection tools running on one or more of the principals; a chaining module configured to generate a graph including multiple objects, each object representing one of the principals, to establish links between objects in the graph based on the rights or privileges, and to determine, using the graph, a path between a source principal and a target principal, the path transiting zero or more additional principals between the source principal and the target principal; and a user interface module configured to display an indication of the path between the source principal and the target principal.

Alternatively or in addition to any of the above described systems, any one or combination of: the data collection module being further configured to communicate with the one or more principals to collect metadata regarding the principals or metadata regarding the rights or privileges the principals have in the environment, and the user interface module being further configured to display at least some of the collected metadata.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A method comprising:
communicating with one or more principals in a system to collect data regarding the principals and the rights or privileges the principals have in the system and to collect metadata regarding the principals or metadata regarding the rights or privileges the principals have in the system;

generating a graph including multiple objects based at least in part on the metadata, each object representing one of the principals;

establishing, in the graph, links between the objects in the graph based on the rights or privileges; and determining, using the graph, a path between a source principal in the system and a target principal in the system, the path transiting zero or more additional principals between the source principal and the target principal.

2. The method as recited in claim 1, further comprising displaying an indication of the path between the source principal and the target principal.

3. The method as recited in claim 2, the displaying further comprising displaying at least some of the collected metadata.

4. The method as recited in claim 1, the one or more data collection tools comprising low-privilege data collection tools.

5. The method as recited in claim 1, the principals including at least one user and at least one computing device.

6. The method as recited in claim 5, the principals further including at least one group and at least one group policy.

7. The method as recited in claim 1, the determining the path comprising determining the path using a weighted shortest path technique.

8. The method as recited in claim 1, further comprising generating a script to automate access to the target principal from the source principal.

9. The method as recited in claim 1, the principals further including at least one group and at least one group policy.

10. The method as recited in claim 1, the generating the graph comprising generating the graph based on both direct access and indirect access that ones of the multiple principals have to others of the multiple principals.

11. The method as recited in claim 1, the rights or privileges including an access control list for a principal, and the generating the graph comprising generating the graph based on the access control list for the principal.

12. The method as recited in claim 1, one of the principals comprising a group principal, and the method further comprising:

receiving a user request to change which users are members of the group; and re-generating at least part of the graph using the changed group membership.

13. The method as recited in claim 1, the communicating further comprising communicating with the one or more principals to collect additional information regarding network access control lists and firewall restrictions, and the generating the graph comprising generating the graph based at least in part on the collected additional information by using the collected additional information to determine what links to display between ones of the multiple objects in the graph.

14. The method as recited in claim 1, the principals including at least one principal in one domain and at least one principal in another domain.

15. The method as recited in claim 1, further comprising:
communicating with the one or more principals to collect data regarding a new type of access to a principal in the system;
generating a new graph including at least one new link based on the new type of access;

determining, using the new graph, a new path between the source principal and the target principal using a weighted shortest path technique; and
displaying an indication of the new path between the source principal and the target principal.

16. A system comprising:
one or more processors; and
one or more computer-readable storage medium having stored thereon multiple instructions that, responsive to execution by the one or more processors, cause the one or more processors to perform acts comprising:
communicating with one or more principals in an environment to collect data regarding the principals and the rights or privileges the principals have in the environment;
generating a graph including multiple objects, each object representing one of the principals;
including, in the graph, links between objects in the graph based on the rights or privileges;
generating at least one set of instructions to automate access to a target principal in the environment from a source principal in the environment; and
using the at least one set of instructions to verify access to the target principal from the source principal.

17. The system as recited in claim 16, the acts further comprising:
receiving a user request to change one of the principals or one of the links; and
re-generating at least part of the graph using the change to the one of the principals or one of the links.

18. The system as recited in claim 16, the acts further comprising:
communicating with the one or more principals to collect data regarding a new type of access to a principal in the system;
generating a new graph including at least one new link based on the new type of access;
determining, using the new graph, a new path between the source principal and the target principal using a weighted shortest path technique; and
displaying an indication of the new path between the source principal and the target principal.

19. A system comprising:
a data collection module configured to communicate with one or more principals in an environment to collect data regarding the principals and the rights or privileges the principals have in the environment and to collect metadata regarding the principals or metadata regarding the rights or privileges the principals have in the system;
a chaining module configured to generate a graph including multiple objects based at least in part on the metadata, each object representing one of the principals, to establish links between objects in the graph based on the rights or privileges, and to determine, using the graph, a path between a source principal and a target principal, the path transiting zero or more additional principals between the source principal and the target principal; and
a user interface module configured to display an indication of the path between the source principal and the target principal.

20. The system as recited in claim 19, the user interface module being further configured to display at least some of the collected metadata.

* * * * *